(12) United States Patent
Paavolainen et al.

(10) Patent No.: US 11,961,074 B2
(45) Date of Patent: Apr. 16, 2024

(54) METHOD AND SYSTEM FOR A NETWORK DEVICE TO OBTAIN A TRUSTED STATE REPRESENTATION OF THE STATE OF THE DISTRIBUTED LEDGER TECHNOLOGY NETWORK

(71) Applicant: Telefonaktiebolaget LM Ericsson (PUBL), Stockholm (SE)

(72) Inventors: Santeri Paavolainen, Masala (FI); Abu Shohel Ahmed, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 449 days.

(21) Appl. No.: 17/292,671

(22) PCT Filed: Nov. 19, 2018

(86) PCT No.: PCT/EP2018/081800
§ 371 (c)(1),
(2) Date: May 10, 2021

(87) PCT Pub. No.: WO2020/104010
PCT Pub. Date: May 28, 2020

(65) Prior Publication Data
US 2022/0012726 A1 Jan. 13, 2022

(51) Int. Cl.
*H04L 29/06* (2006.01)
*G06F 16/27* (2019.01)
(Continued)

(52) U.S. Cl.
CPC ........... *G06Q 20/389* (2013.01); *G06F 16/27* (2019.01); *G06Q 20/3825* (2013.01);
(Continued)

(58) Field of Classification Search
None
See application file for complete search history.

(56) References Cited

U.S. PATENT DOCUMENTS 7,184,421 B1 * 2/2007 Liu ................. H04W 40/28
370/254
7,194,761 B1 * 3/2007 Champagne ............ H04L 63/08
713/168

(Continued)

OTHER PUBLICATIONS

Delay and Communication Tradeoffs for Blockchain Systems With Lightweight IoT Clients by Pietro Danzi et al.—Oct. 17, 2018.

(Continued)

*Primary Examiner* — Lisa C Lewis
(74) *Attorney, Agent, or Firm* — Baker Botts L.L.P.

(57) ABSTRACT

A method performed by a trusted network device and a network device for transmitting a trusted state representation of a state of a DLT network to one or more network devices is described. The trusted network device determines a state indicator. The state indicator is a representation of a state of the DLT network at a given time. The trusted network device transmits to one or more network devices a beacon message including the state indicator. The beacon message is signed based on authentication information associated with the trusted network device. The state indicator is to be used by the one or more network devices as a trusted current state of the DLT network.

17 Claims, 8 Drawing Sheets

(51) Int. Cl.
  *G06F 21/00* (2013.01)
  *G06Q 20/38* (2012.01)
  *G06Q 20/40* (2012.01)
  *H04L 9/30* (2006.01)
  *H04L 9/40* (2022.01)

(52) U.S. Cl.
  CPC ....... *G06Q 20/3829* (2013.01); *G06Q 20/401* (2013.01); *H04L 9/3073* (2013.01); *H04L 63/0876* (2013.01)

(56) References Cited

U.S. PATENT DOCUMENTS

| | | | | |
|---|---|---|---|---|
| 10,129,299 | B1* | 11/2018 | McClintock | H04L 63/0869 |
| 10,149,159 | B1* | 12/2018 | Perfitt | H04L 9/3265 |
| 10,750,351 | B1* | 8/2020 | Paczkowski | H04L 12/4625 |
| 2004/0002943 | A1* | 1/2004 | Merrill | H04L 41/0893 |
| 2008/0125190 | A1* | 5/2008 | Jan | H04W 52/0216 455/574 |
| 2009/0006595 | A1* | 1/2009 | Abzarian | H04L 63/029 709/223 |
| 2013/0067041 | A1* | 3/2013 | Low | H04W 8/245 709/220 |
| 2013/0163491 | A1* | 6/2013 | Singh | H04W 52/0216 370/311 |
| 2015/0135268 | A1* | 5/2015 | Silverman | H04L 63/08 726/3 |
| 2016/0353382 | A1* | 12/2016 | Xue | H04W 52/0251 |
| 2018/0097779 | A1 | 4/2018 | Karame et al. | |
| 2018/0150799 | A1 | 5/2018 | Hunt et al. | |
| 2018/0152955 | A1* | 5/2018 | Park | H04W 72/1215 |
| 2018/0286207 | A1* | 10/2018 | Baker | A24F 40/65 |
| 2019/0103030 | A1* | 4/2019 | Banga | G08G 5/0082 |
| 2019/0245831 | A1* | 8/2019 | Petit | H04L 63/0823 |
| 2019/0289068 | A1* | 9/2019 | Ma | H04L 67/12 |
| 2019/0331363 | A1* | 10/2019 | Peng | F24H 9/2007 |
| 2020/0100168 | A1* | 3/2020 | Kim | H04W 8/005 |

OTHER PUBLICATIONS

PCT Notification of Transmittal of the International Search Report and the Written Opinion of the International Searching Authority, or the Declaration issued for International application No. PCT/EP2018/081800—dated May 13, 2019.

BIP: 150; Layer: Peer Services; Title: Peer Authentication; Author: Jonas Schnelli; https://github.com/bitcoin/bips/wiki/Comments:BIP-0150; Status: Draft—Mar. 23, 2016.

BIP: 151; Layer: Peer Services; Title: Peer-to-Peer Communication Encryption; Author: Jonas Schnelli; https://github.com/bitcoin/bips/wiki/Comments:BIP-0151; Status: Withdrawn—Mar. 23, 2016.

BIP: 37; Layer: Peer Services; Title: Connection Bloom filtering; Authors: Mike Hearn and Matt Corallo; https://github.com/bitcoin/bips/wiki/Comments:BIP-0037; Status: Final—Oct. 24, 2012.

Mastering Bitcoin, 2nd Edition, Programming the Open Blockchain by Andreas M. Antonopoulos; Published by O'Reilly Media, Inc.—2017.

* cited by examiner

METHOD AND SYSTEM FOR A NETWORK DEVICE TO OBTAIN A TRUSTED STATE REPRESENTATION OF THE STATE OF THE DISTRIBUTED LEDGER TECHNOLOGY NETWORK

PRIORITY

This nonprovisional application is a U.S. National Stage Filing under 35 U.S.C. § 371 of International Patent Application Serial No. PCT/EP2018/081800 filed Nov. 19, 2018 and entitled "Method and System for a Network Device to Obtain a Trusted State Representation of the State of the Distributed Ledger Technology Network" which is are hereby incorporated by reference in its entirety.

TECHNICAL FIELD

The present disclosure relates to the field of distributed ledger technology; and more specifically, to mechanisms for enabling a network device to obtain a trusted state representation of the state of the distributed ledger technology network.

BACKGROUND

Internet of Things (IoT) devices are electronic devices which often have reduced capabilities. For example, most IoT devices have a limited amount of processing power, memory, storage, and are often running all the time, or periodically on battery power.

Distributed ledger technology (DLT) systems are platforms used for building, running, and deploying a decentralized, distributed and public distributed digital ledger. In a DLT system a digital ledger permanently records digital records of transactions that occur between two parties. The records cannot be altered retroactively without the alteration of all subsequent transactions in the digital ledger and without consensus from other nodes in the network. This allows the participants to verify and audit transactions inexpensively and securely. A digital ledger is maintained without a central authority or implementation. For example, the digital ledger can be a blockchain that includes blocks secured and linked to one another using cryptographic mechanisms.

With the advent of distributed ledger technologies (DLT), the question of whether it is possible to use DLTs in network with IoT devices arises. A potential use case is to use smart contracts residing in distributed ledgers as sources or sinks of information. An application that can be contemplated is the use of the smart contracts for the secure configuration of the IoT devices.

However, reduced capability network devices are not suitable to operate as full nodes in distributed ledgers as they don't have the resources to perform validation operations and/or storage of a ledger's state due to the limit of available resources. An alternative approach is to use a light client protocol (e.g., Simplified Payment Verification (SPV) in Bitcoin or Light Ethereum Subprotocol (LES) in Ethereum are examples of light client protocols) in the reduced capability devices.

Although full security is only possible for a full node in the DLT network, a light client protocol allows light nodes to process data and to receive data from the network about sections of the digital ledger that are of interest to them. Light client protocols are restricted in the class of security guarantees they can provide with respect to operations in the distributed ledger network.

Reduced capability devices (e.g., IoT devices) are usually poorly connected to other nodes of the distributed ledger. When a reduced capability device is connected to the other nodes of the distributed ledger, it is often through a single intermediary network device (e.g., base station (BS), gateway, etc.) that acts as a bottleneck to the network. The intermediary network device makes it impossible for a reduced capability device running a light client protocol to trust the communication it has with independent full nodes of the distributed ledger.

SUMMARY

One general aspect includes a method performed by a trusted network device for transmitting a trusted representation of a state of a distributed ledger technology (DLT) network to one or more network devices, the method including: determining a state indicator, where the state indicator is a representation of a state of the DLT network at a given time; and transmitting to one or more network devices a beacon message including the state indicator, where the beacon message is signed based on authentication information associated with the trusted network device and the state indicator is to be used by the one or more network devices as a trusted current state of the DLT network.

One general aspect includes a trusted network device for transmitting a trusted representation of a state of a distributed ledge technology (DLT) network to one or more network devices, the trusted network device including: one or more processors; and a computer memory storing a set of computer readable instructions that when executed by the one or more processors cause the trusted network device to determine a state indicator, where the state indicator is a representation of a state of the DLT network at a given time; and transmit to one or more network devices a beacon message including the state indicator, where the beacon message is signed based on authentication information associated with the trusted network device and the state indicator is to be used by the one or more network devices as a trusted current state of the DLT network.

One general aspect includes a method performed by a network device, the method including: receiving a beacon message; determining that the beacon message is signed based on authentication information associated with a trusted network device; and responsive to determining that the beacon message is signed based on the authentication information, setting a state indicator extracted from the beacon message as a current state of a distributed ledger technology (DLT) network for the network device.

One general aspect includes a network device including: one or more processors, and a computer readable storage medium storing a set of computer readable instructions that when executed by the one or more processors cause the network device to receive a beacon message; determine that the beacon message is signed based on authentication information associated with a trusted network device; responsive to determining that the beacon message is signed based on the authentication information, set a state indicator extracted from the beacon message as a current state of a distributed ledger technology (DLT) network for the network device.

BRIEF DESCRIPTION OF THE DRAWINGS

The inventive concept may best be understood by referring to the following description and accompanying drawings that are used to illustrate embodiments of the inventive concept. In the drawings.

DETAILED DESCRIPTION

The following description describes methods and apparatus for enabling a network device to obtain a trusted state representation of the state of the distributed ledger technology network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the present disclosure may be practiced without such specific details. In other instances, control structures, gate level circuits and full software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the inventive concept. However, such notation should not be taken to mean that these are the only options or optional operations, and/or that blocks with solid borders are not optional in certain embodiments of the inventive concept.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Existing solutions for obtaining a trusted representation of a digital ledger's state:

Several solutions exist for enabling network devices of a digital ledger network to obtain a trusted representation of a global state of the digital ledger. For example, when the network devices of the DLT network have access to the Internet, the network devices can contact multiple network devices which have full capabilities to obtain the representation of the state of the DLT network. Based on information received from the multiple other nodes in the DLT network, the reduced capability network device can with a high likelihood obtain the correct information that is representative of the state of the DLT network. This process may be referred to as probabilistic security model.

Another solution provides a method where the DLT's global state is compressed into a description that is agreed-upon by all validating peer network devices to establish a "certified checkpoint." The certified checkpoint provides a point in time that a reduced-capability device can use as a trusted representation of the global state of the DLT network. This trusted representation can be established when the reduced-capability device can verify it and cannot be altered by a malicious intermediary network device that connects the reduced network device with the rest of the network.

Some DLT networks circumvent this problem altogether by defining a particular entity as a trust anchor in the system. Thus, with governed (public, permissioned, or private) DLTs with a trust root that can be configured into the reduced-capability device, the device can use that trust anchor to validate any and all information the intermediary network device provides it.

The reduced capability network device has no guaranteed mechanism of establishing that it is receiving information from the "true" DLT network. It is possible for a malicious intermediary network to subvert the flow of information and provide an alternative view to the reduced capability device which is internally consistent but is not globally consistent with the "true" network it wants to communicate with.

One of the motivations of using DLT networks is to ensure that the data sent/received by the devices can be audited and that communicating parties cannot exploit the state of the DLT without leaving a permanent trace of their activities. However, due to the weakness mentioned above of reduced devices, an attacker, e.g., a malicious intermediary network device, can for example push stale device configuration without leaving an auditable trace in the global trusted DLT state. Therefore, there is a need for a robust solution that enables reduced capability network devices to obtain a trusted representation of the state of the DLT network.

Mechanisms for Obtaining a Trusted State Representation of the State of the Distributed Ledger Technology Network In one embodiment, a method performed by a trusted network device and a network device for transmitting a trusted state representation of a state of a DLT network to one or more network devices is described. The trusted network device determines a state indicator. The state indicator is a representation of a state of the DLT network at a given time. The trusted network device transmits to one or more network devices a beacon message including the state indicator. The beacon message is signed based on authentication information associated with the trusted network device. The state indicator is to be used by the one or more network devices as a trusted current state of the DLT network.

In one embodiment, a method performed by a network device and a network device for obtaining a trusted representation of a state of a DLT network is described. The network device receives a beacon message. The network device determines that the beacon message is signed based on authentication information associated with a trusted network device. Responsive to determining that the beacon message is signed based on the authentication information, the network device sets a state indicator extracted from the beacon message as a current state of the DLT network for the network device.

Figure 1:
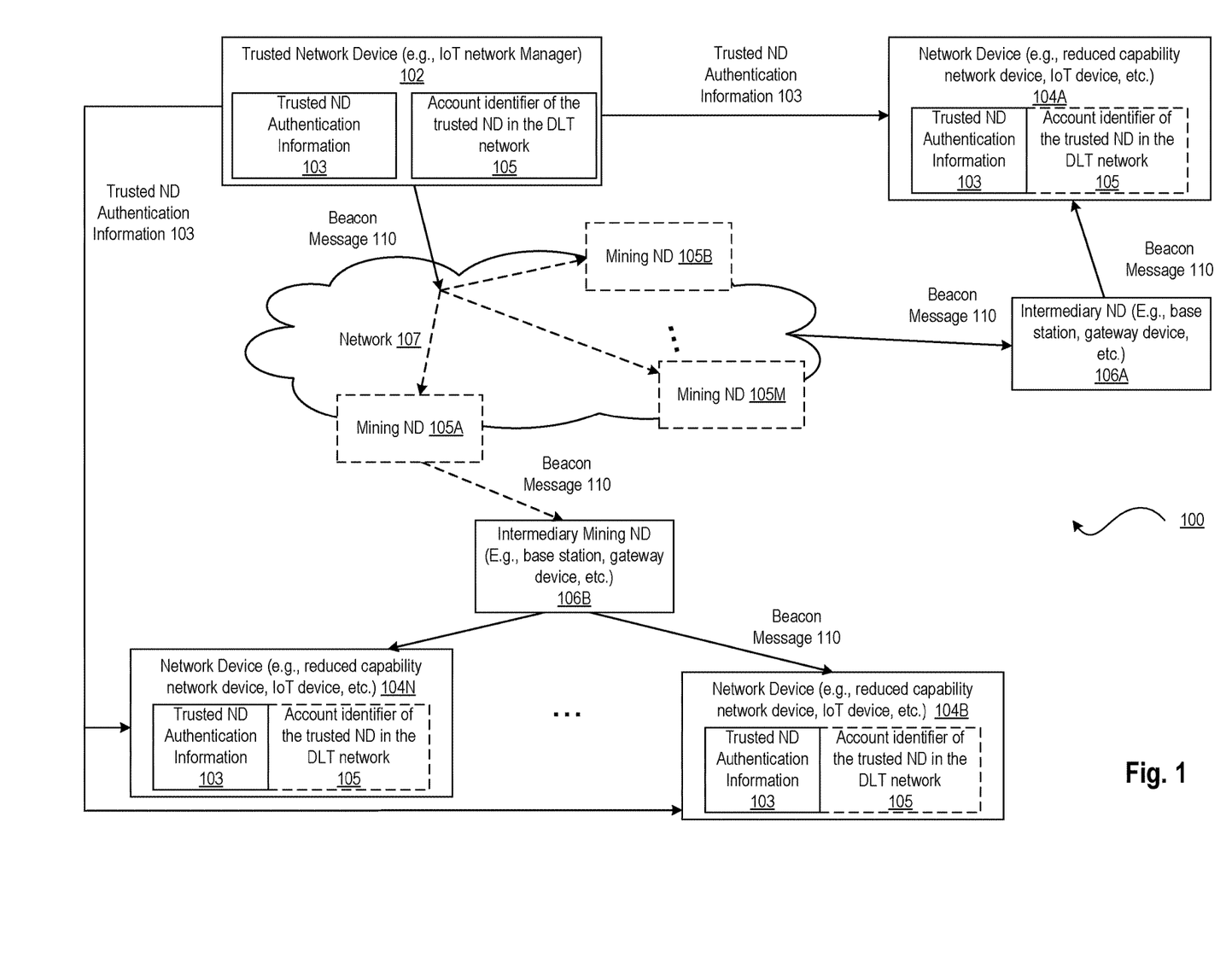
FIG. 1 illustrates a block diagram of an exemplary distributed ledger network for enabling a network device to obtain a trusted state representation of the state of the distributed ledger technology network, in accordance with some embodiments.

FIG. 1 illustrates a block diagram of an exemplary distributed ledger technology (DLT) network 100 for enabling a network device to obtain a trusted representation of the state of the distributed ledger technology network, in accordance with some embodiments. In the following description the term node and network device will be alternatively used without departing from the scope of the present embodiments.

The DLT network 100 includes a trusted network device 102; one or more mining network devices 105A, 105B, and 105M; intermediary network devices 106A, 106B; and one or more network devices 104A-N. The various network devices communicate through a physical network 105 (wired, wireless, or a combination of wired and wireless networking technology).

The trusted network device 102 is an electronic device that is part of the DLT network 100. The trusted network device 102 is a full node of the DLT network in the sense that it can run DLT protocols that allows it to validate and obtain a trusted current state of the DLT network at any time. The trusted network device 102 has a global view of the state of the DLT network. For example, in blockchain environments, the trusted network device 102 stores the blockchain and is operative to validate the state of the blockchain at any moment in time. The trusted network device 102 is operative to determine a representation of the state of the DLT network at a given time and securely transmit this representation to one or more other nodes of the DLT network.

In one embodiment, the trusted network device 102 can be a device used to configure and manage the network devices 104A-N. In another embodiment, the trusted network device 102 can be a third-party device that is trusted by the device that can configure and manage the network devices 104A-N. The trusted network device 102 stores a trusted ND authentication information 103 and an account identifier of the trusted ND in the DLT network 100. The trusted ND authentication information 103 can be used to uniquely authenticate the trusted ND 102. The account identifier of the trusted ND, which will be referred to herein as the trusted ND account ID, uniquely identifies the trusted ND 102 in the DLT network 100. In some embodiments, the authentication information 103 may also act as a unique identifier of the trusted ND 102 in the DLT network 100 and there is no need to have the additional account identifier 105 as separate data. In other embodiments, the authentication information 103 is associated with an account identifier 105 of the trusted ND 102 that uniquely identifies the trusted ND 102 in the DLT network 100, where the account identifier is different than the authentication information 103.

In some embodiments, the authentication information 103 is a public key of a private/public keys pair uniquely associated with the trusted network device 102. In another example, the authentication information 103 can be a hash of an address of the trusted ND 102 in the DLT network 100. In some embodiments, a derivation of the public key can be used as an account identifier of the trusted ND 102 in the DLT network 100. In other embodiments, another form of ID can be used to identify the trusted ND's account in the DLT network 100 if keys and addresses are disassociated in the DLT network without departing from the scope of the present embodiments.

The mining network devices 105A, 105B, and 105M are electronic devices that are part of the DLT network 100. The mining network devices 105A, 105B, and 105M are full nodes of the DLT network. At least one mining ND includes the beacon message in the digital ledger of the DLT network. For example, when the DLT network 100 is a blockchain network, the mining ND includes the beacon message in a block and this block is committed to the blockchain through a consensus mechanism of the blockchain network.

The intermediary network devices 106A and 106B are electronic devices that are part of the DLT network 100. The intermediary network devices 106A-B are operative to connect the NDs 104A-N to other nodes of the DLT network. The intermediary network devices 106A-B act as bottlenecks to the ND 104A-N. These devices 106A-B are operative to run a light client protocol to communicate with the NDs 104A-N. For example, each of the NDs 106A-B can be a base station, a gateway device, a mobile device, or some other system providing a light ledger protocol service to the network device 104A-N.

The operations of the various components of the system 100 will be described with reference to the transaction diagrams of FIGS. 2-4.

Figure 2:
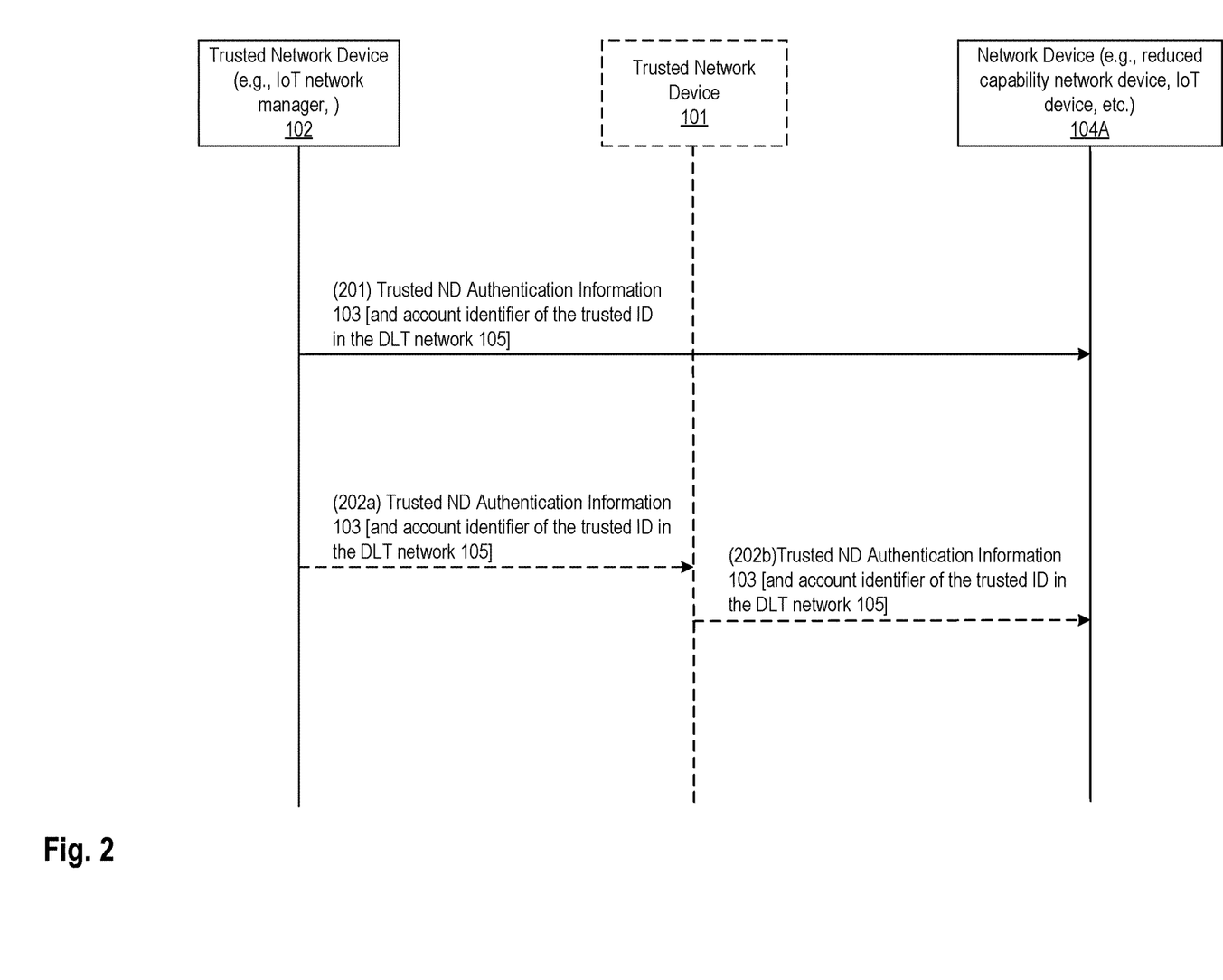
FIG. 2 illustrates a block diagram of exemplary operations for configuring a network device with authentication information, in accordance with some embodiments.

FIG. 2 illustrates a block diagram of exemplary operations for configuring a network device with authentication information, in accordance with some embodiments. The operations of FIG. 2 are performed during an initial phase during which the network device 104A is configured with authentication information uniquely associated with the trusted ND 102. This phase can be performed during the deployment of the network devices 104A-N and their initial configuration. Alternatively, this phase is performed at a later time during a reconfiguration phase, when initial configuration parameters of the NDs 104A-N are updated.

In some embodiments, the authentication information 103 may also act as a unique identifier of the trusted ND 102 in the DLT network 100 and there is no need to transmit additional information to the network device 104A. In other embodiments, the authentication information 103 is associated with an account identifier of the trusted ND 102 that uniquely identifies the trusted ND 102 in the DLT network 100, where the account identifier is different than the authentication information 103. In some embodiments, the authentication information 103 is a public key of a private/public keys pair uniquely associated with the trusted network device 102. In another example, the authentication information 103 can be a hash of an address of the trusted ND 102 in the DLT network 100. In some embodiments, a derivation of the public key can be used as an account identifier of the trusted ND 102 in the DLT network 100. In other embodiments, another form of ID can be used to identify the trusted ND's account in the DLT network 100 if keys and addresses are disassociated in the DLT network without departing from the scope of the present embodiments.

In some embodiments, in addition to the authentication information 103, the ND 104A can contain be configured to store the details of the transport protocol to be used for transmission/receipt of the beacon message. For example, when out-of-band SMS signaling is used, potential subscriber addresses whose messages only are processed as beacons are stored in the ND 104A. In another example, if an out-of-band general Internet protocol is used, the configuration of the ND 104A may include additional information and parameters needed to communicate with the corresponding protocol. For example, if the information is passed via an MQTT pub-sub channel, the MQTT server address and pub-sub channel name are configured in the ND 104A. Other alternative communication mechanisms, such as HTTP/HTTPS polling, multicast packets, etc. may be used and the ND 104A is configured accordingly to allow the receipt of the messages through these mechanisms and the identification of the beacon messages.

In other example, in-band transactions can be used. In some embodiments, it is possible to narrow the set of transactions the ND 104A tries to extract beacons from based on the destination address of the transaction. For example, when ND 104A has its own identifier in the DLT network (e.g., an address in the DLT network), the device can look for transactions specifically addressed to it. The transaction destination address can be also used to define anycast, multicast and broadcast signaling across the deployed network devices 104A-N based on characteristics such as device model, geographic region, etc. The configuration of the ND 104A-N can include any additional details needed for the receipt of beacon messages.

In one embodiment, the trusted ND 102 configures, at operation 201, the network device 104A with the authentication information 103. In another embodiment, the trusted ND 102 can be a third-party network device that is communicatively coupled with an intermediary ND 101 and configures the ND 104A through the intermediary ND 101. The intermediary ND 101 is a network device that is trusted by the ND 104A. In this embodiment, the trusted ND 102 transmits the authentication information 103 and optionally the account identifier 105 to the intermediary network device 101 in a first operation 202a. The network device 101 transmits the authentication information 103 and optionally the account identifier 107 to the ND 104A.

In some embodiments, the configuration of the ND 104A is performed prior to the ND 104A being deployed to a site in which it will operate. Alternatively, the configuration of the ND 104A can be performed when the ND 104A is already deployed. In all embodiments, the network device 104A is operative to trust the device that is configuring it and to trust the authentication information 103 received. While the embodiments above are described with reference to the ND 104A, similar operations can be performed for configuring any of the NDs 104B-N.

Figure 3:
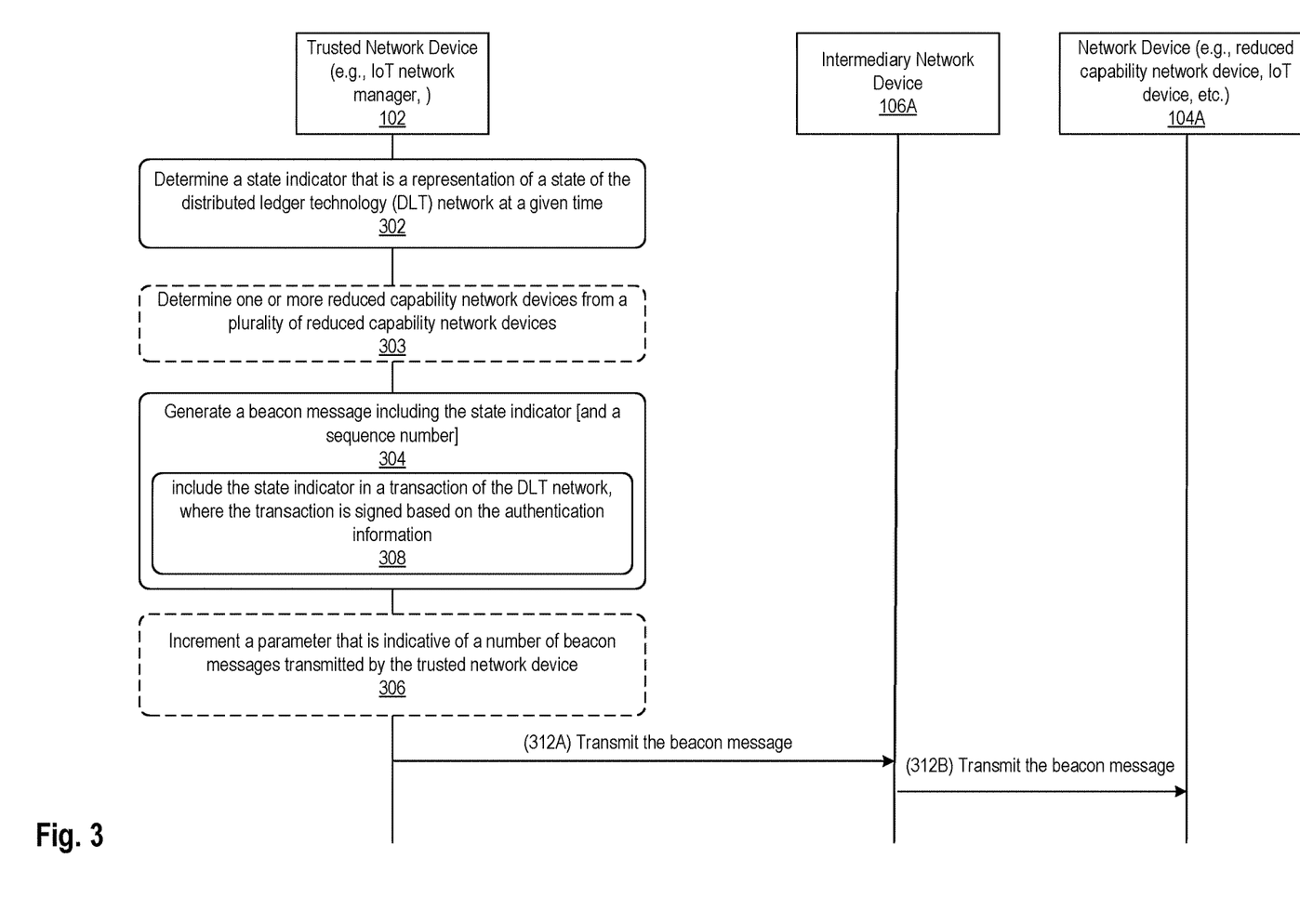
FIG. 3 illustrates a block diagram of exemplary operations for transmitting a beacon message including a state indicator, in accordance with some embodiments.

FIG. 3 illustrates a block diagram of exemplary operations for transmitting a beacon message including a state indicator, in accordance with some embodiments.

At operation 302, the trusted ND 102 determines a state indicator. The state indicator is a representation of a state of the DLT network at a given time. Being a full node of the DLT network, the ND 102 has access to or stores the global state of the DLT network 100 at any given time. The DLT network 100 determines a representation of the current state of the DLT network 100. In non-limiting exemplary embodiments, when the DLT network is a blockchain network, the state indicator is determined based on the blockchain that is store in or accessible to the trusted ND 102. In one example, the state indicator can be a hash of a block from the blockchain stored in the trusted ND 102. In another example a hash of block header can be used as a state indicator.

In some embodiments, where the DLT network 100 is a blockchain network, the representation of the state of the DLT network can be determined based on its suitability for the NDs 104A-B to be used as a ground truth. The suitability of a state of the DLT network 100 can be determined based on security requirements of the network of 104A-N devices in conjunction with the security capabilities of the DLT system. For example, in some blockchain networks, the trusted ND 102 needs to consider block depth and confirmation time and balance the risk of conflicting forks in the blockchain (whose probability decreases with block depth) and the time required to wait (which increases with block depth) before considering the likelihood of blockchain fork unlikely at the given block depth. Other requirements or criteria can be considered to establish a representation of the DLT network 100 by the trusted ND 102 as a state indicator to be transmitted to the NDs 104A-N without departing from the scope of the present embodiments.

The trusted ND 102 determines, at operation 303, the one or more network devices 104A from a plurality of network devices 104A-N coupled with the trusted network device 102. This operation is optional and can be skipped in some embodiments. In some embodiments, the trusted ND 102 is to communicate with a subset of the NDs 104A-N to transmit the beacon message and the subset of the NDs is selected. For example, when the trusted ND 102 is a manager of multiple IoT networks each including different sets of IoT NDs, the trusted ND 102 may select a particular IoT network including a subset of all the IoT devices to which it is to transmit a state indicator of the DLT network 100. In other embodiments, the trusted ND 102 communicates with all NDs 104A-N to transmit the beacon message.

At operation 304, the trusted ND 102 generates the beacon message 110 including the state indicator. In some embodiments, the beacon message further includes a sequence number. The sequence number is indicative of a number of beacon messages transmitted from the trusted ND 102. The sequence number can be used by the receiving network device, e.g., ND 104A, to prevent any malicious entity, e.g., the intermediary ND 106A, from replaying past beacon messages. In these embodiments, the sequence number is incremented for each beacon message sent. In these embodiments, the trusted ND 102 performs operation 306, at which a parameter that is indicative of a number of beacon messages transmitted by the trusted network device 102 is incremented. The current value of this parameter is then used as a sequence number for the next beacon message the trusted ND is to send to the ND 104A. In other embodiments, the sequence number can be omitted from the beacon message if the state indicator contains a parameter that can be used by the receiving network device, e.g., ND 104A, to prevent any malicious entity, e.g., the intermediary ND 106A, from replaying past beacon messages. For example, in some blockchain DLT networks, the block header contains a monotonic sequence number. In this example, there is no need to add a separate sequence number when the state indicator is the block hash.

The beacon message 110 is generated such that it cannot be tampered with and its sender can be securely identified. In some embodiments, the beacons message is generated, operation 308, by including the state indicator in a transaction of the DLT network 100 where the transaction is signed based on the authentication information 103.

In some embodiments, the transaction is automatically signed by the trusted ND 102 with the authentication information 103 based on some standard DLT network protocols. In these embodiments, the beacon message 110 that is transmitted from the ND 102 is a transaction message of the DLT network. In other embodiments, while the state indicator can be included in a transaction of the DLT network, the beacon message including the transaction can be another type of message that allows the trusted ND 102 to transmit the state indicator in a secure manner. For example, any of the following transmission protocols: a short message service (SMS), Message Queuing Telemetry Transport (MQTT), HyperText Transfer Protocol (HTTP), or Hyper Text Transfer Protocol Secure (HTTPS) can be used to transmit the state indicator and the beacon message is a message generated based on the selected protocol. Some of these protocols may provide intrinsic integrity protection, e.g., HTTPs or DLT transaction message, such that the beacon message is automatically signed with the authentication information 103. Alternatively, other ones of these protocols may not provide authentication. In these alternative embodiments, the trusted. ND 102 is operative to sign the transaction including the state indicator based on the authentication information 103 prior to transmitting the transaction as part of the beacon message. For example, when the authentication information 103 is a public key, the trusted ND 102 signs the transaction including the state indicator with the corresponding private key.

By transmitting a beacon message that includes a signed transaction the trusted ND 102 allows the receiving ND 104A to securely identify the sender of the beacon message and the beacon message is tamper-proof.

In some embodiments, the beacon message may include one or more additional fields. For example, the beacon message can include one or a combination of two or more of a transaction value, transaction processing fees, or a source and/or a destination address. These, and potentially other fields, can be set in accordance to normal processing requirements of the DLT network 100. In particular, a destination address may be used to target a specific network device, a group of network devices, or all devices that are configured with that particular trusted ND 102 as the beacon message sender.

For example, in some exemplary blockchain DLT network, the beacon transaction's value can be zero (no transactional value), processing fees set to a value that is high enough to guarantee rapid inclusion in a future block, and the whole transaction would be signed with the trusted ND 102's private key, providing integrity protection for the transaction data. The state indicator is included as the data portion of the transaction. The destination address can match an account, or it can be a dummy address, or address of a smart contract. The destination address may affect the filtering rules applied by the network device ND 104A, but the variability in addressing does not affect the security semantics of the state indicator.

At operation 312A, the trusted ND 102 transmits the beacon message including the state indicator towards the network device 104A. In some embodiments, the beacon message 110 is sent to one or more mining NDs, e.g., NDs 105A-M. In some embodiments, the intermediary ND 106A can be a mining ND in the DLT network 100, while in other embodiments, the intermediary ND 106A is not a mining ND. At least one mining ND includes the beacon message in the digital ledger of the DLT network. For example, when the DLT network 100 is a blockchain network, the mining ND includes the beacon message in a block and this block is committed to the blockchain through a consensus mechanism of the blockchain network.

The beacon message 110 is received by the intermediary ND 106A that is coupled with the network device 104A that is intended to receive the beacon message 110. In some embodiments, the beacon message 110 is received by the intermediary ND 106A as part of the consensus mechanism of the DLT network.

The intermediary ND 106A can be a genuine ND or a malicious ND. When the intermediary ND 106 is a malicious ND it can decide to alter the beacon message or to not transmit the beacon message to the ND 104A. When the beacon message is altered by the ND 106A and transmitted to the ND 104A, the ND 104A is operative to detect the tampering. If the beacon message is not tampered with it is transmitted to the ND 104A at operation 312B.

Figure 4:
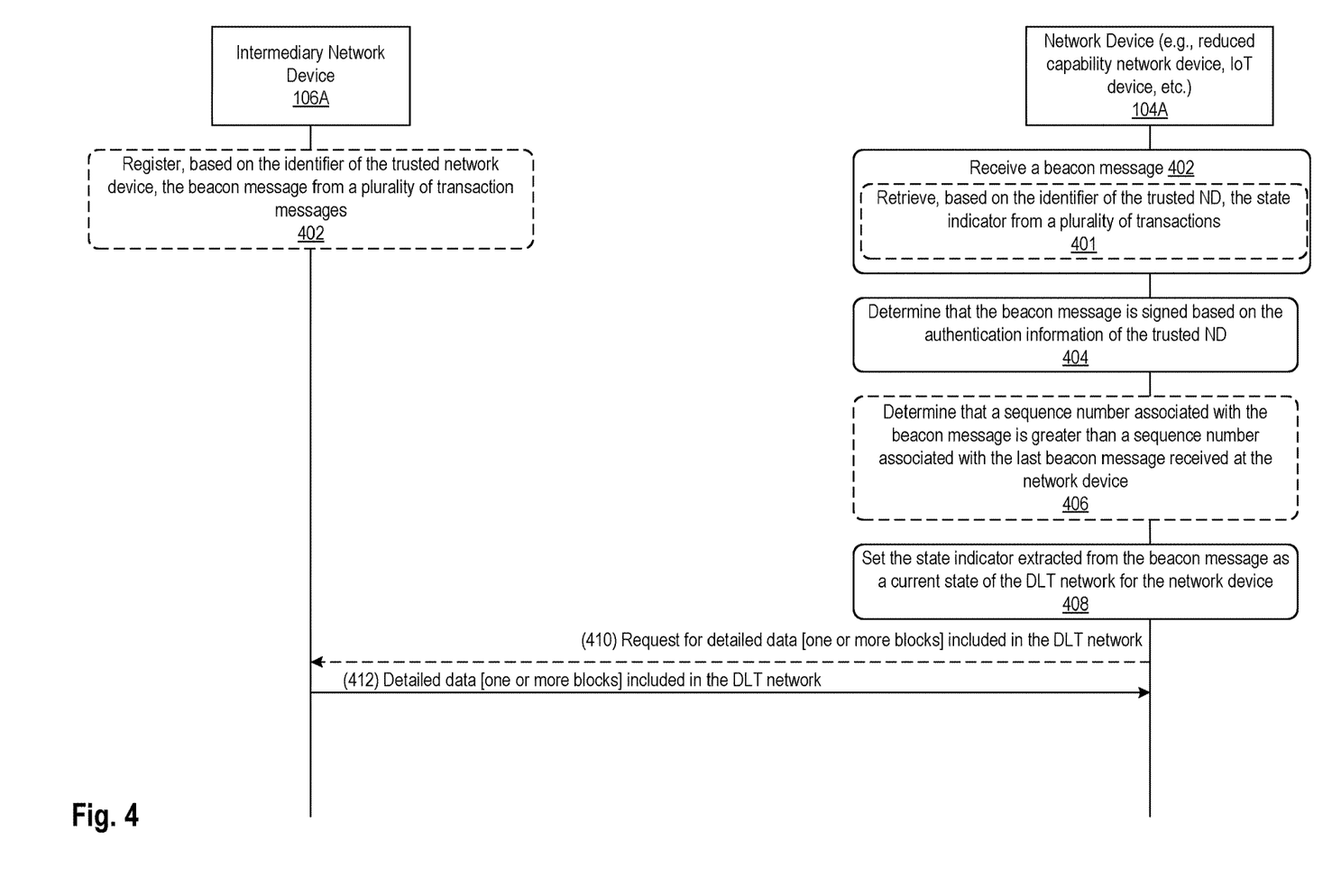
FIG. 4 illustrates a block diagram of exemplary operations for determining a trusted representation of the DLT network based on the beacon message, in accordance with some embodiments.

FIG. 4 illustrates a block diagram of exemplary operations for determining a trusted representation of the DLT network based on the beacon message, in accordance with some embodiments. At operation 402, the ND 104A receives a beacon message. The beacon message is received according to the transport mechanism used to transmit the message. The beacon message is obtained by one or more operations of the light client protocol run by the ND 104A. In some embodiments, the ND 104A request all transactions of a block that is to include the beacon message and may go through the transactions to identify the transaction including the state indicator. For example, at operation 401, the ND 104A retrieves, based on the identifier of the trusted ND 102, the state indicator from a plurality of transactions that are received.

At operation 404, the ND 104A determines that the beacon message is signed based on authentication information 103 associated with a trusted network device 102. Responsive to determining that the beacon message is not signed based on the authentication information, i.e., the beacon message is not a valid message, the ND 104A discards the message. This can be an indication that the intermediary ND 106A is a malicious device.

Responsive to determining that the beacon message is signed based on the authentication information, the ND 104A sets, at operation 408, a state indicator extracted from the beacon message as a current state of the DLT network for the network device 104A. In some embodiments, prior to setting the state indicator as a current state of the DLT network 100, the ND 104A determines, operation 406, whether a sequence number associated with the beacon message is greater than a sequence number associated with the last beacon message received at the network device 104A. In these embodiments, setting the state indicator as the current state of the DLT network 100 is performed in response to determining that the sequence number associated with the beacon message is greater than the sequence number associated with the last beacon message received at the network device. Alternatively, if the sequence number associated with the beacon message is not greater than the sequence number associated with the last beacon message received at the network device, the beacon message is discarded. This can be an indication that the intermediary ND 106A is a malicious device.

In some embodiments, the ND 104A is further operative to obtain detailed data from the DLT network 100 based on the current state of the DLT network 100 established for the ND 104A. The ND 104A can request, operation 410, detailed data based on the state indicator and receive, at operation 412, the detailed data. The current state of the DLT network is used as a ground truth for the ND 104A allowing the ND 104A to have a view of the global DLT state.

The embodiments presented herein describe systems and methods for establishing a shared view of a state of a digital ledger between a trusted entity (e.g., trusted ND 102), and a network device (e.g., ND 104A). In some embodiments, the network device is a reduced capability device such as an IoT device, with limited resources and limited network connectivity. Without the proposed solution, the reduced capability ND cannot gain the common security guarantees of a DLT state that are available to a full node, or a light client with good network connectivity.

The mechanisms described herein allow reduced capability NDs to establish a ground truth, which can be implemented in-band within the DLT network. The mechanisms allow the reduced capability device owners to deploy the solution without an explicit support of a trust anchor entity in the DLT. In addition, the beacon message The operations in the flow diagrams will be described with reference to the exemplary embodiments of FIG. 1. However, it should be understood that the operations of the flow diagrams can be performed by embodiments of the inventive concept other than those discussed with reference to FIG. 1, and the embodiments of the inventive concept discussed with reference to these other figures can perform operations different than those discussed with reference to the flow diagrams.

Figure 5:
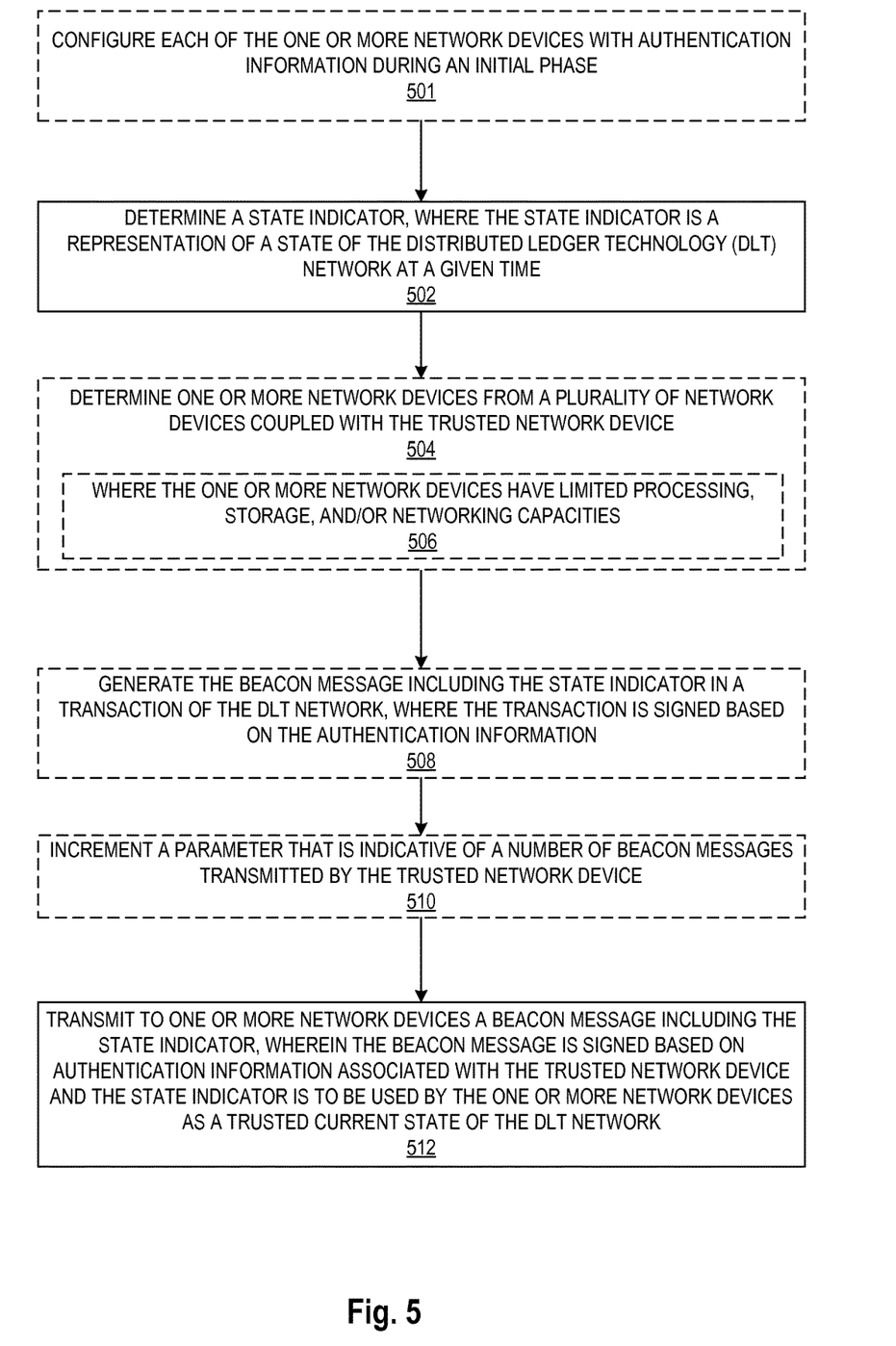
FIG. 5 illustrates a flow diagram of exemplary operations for generating and transmitting a beacon message, in accordance with some embodiments.

FIG. 5 illustrates a flow diagram of exemplary operations for generating and transmitting a beacon message, in accordance with some embodiments. The operations of FIG. 5 are performed by a trusted network device 102 for transmitting a trusted representation of a state of the distributed ledger technology network 100 to network device 104A. While the operations are described with respect to the trusted network device 102 communicating with a single network device 104A, the trusted network device 102 can communicate with multiple network devices of the DLT network 100. For example, similar operations can be performed with network devices 104B-104N.

During an initial phase, the trusted ND 102 configures, at operation 501, each of the one or more network devices 104A, 104B-N with the authentication information 103. This phase can be performed during the deployment of the network devices 104A-N and their initial configuration. Alternatively, this phase is performed later during a reconfiguration phase, when initial configuration parameters of the NDs 104A-N are updated.

In some embodiments, the authentication information 103 may also act as a unique identifier of the trusted ND 102 in the DLT network 100 and there is no need to transmit additional information to the network device 104A. In other embodiments, the authentication information 103 is associated with an account identifier of the trusted ND 102 that uniquely identifies the trusted ND 102 in the DLT network 100, where the account identifier is different than the authentication information 103. In some embodiments, the account identifier 105 is transmitted to the NDs 104A-N. In some embodiments, the account identifier can be transmitted as part of the authentication information 103.

In one example, the authentication information 103 can be a public key of a private/public keys pair uniquely associated with the trusted network device 102. In another example, the authentication information 103 can be a hash of an address of the trusted ND 102 in the DLT network 100. In some embodiments, a derivation of the public key can be used as an account identifier of the trusted ND 102 in the DLT network 100. In other embodiments, another form of identification can be used to identify the trusted ND's account in the DLT network 100 if keys and addresses are disassociated in the DLT network without departing from the scope of the present embodiments.

In some embodiments, in addition to the authentication information 103, the ND 104A can contain be configured to store the details of the transport protocol to be used for transmission/receipt of the beacon message. For example, when out-of-band SMS signaling is used, potential subscriber addresses whose messages only are processed as beacons are stored in the ND 104A. In another example, if an out-of-band general Internet protocol is used, the configuration of the ND 104A may include additional information and parameters needed to communicate with the corresponding protocol. For example, if the information is passed via an MQTT pub-sub channel, the MQTT server address and pub-sub channel name are configured in the ND 104A. Other alternative communication mechanisms, such as HTTP/HTTPS polling, multicast packets, etc. may be used and the ND 104A is configured accordingly to allow the receipt of the messages through these mechanisms and the identification of the beacon messages.

In other example, in-band transactions can be used. In some embodiments, it is possible to narrow the set of transactions the ND 104A tries to extract beacons from based on the destination address of the transaction. For example, when ND 104A has its own identifier in the DLT network (e.g., an address in the DLT network), the device can look for transactions specifically addressed to it. The transaction destination address can be also used to define anycast, multicast and broadcast signaling across the deployed network devices 104A-N based on characteristics such as device model, geographic region, etc. The configuration of the ND 104A-N can include any additional details needed for the receipt of beacon messages.

In one embodiment, the trusted ND 102 directly configures the network device 104A with the authentication information 103. In another embodiment, the trusted ND 102 can be a third-party network device that is communicatively coupled with an intermediary ND 101 and configures the ND 104A through the intermediary ND 101. The intermediary ND 101 is a network device that is trusted by the ND 104A. In this embodiment, the trusted ND 102 transmits the authentication information 103 and optionally the account identifier 105 to the intermediary network device 101. The network device 101 transmits the authentication information 103 and optionally the account identifier 105 to the ND 104A.

In some embodiments, the configuration of the ND 104A is performed prior to the ND 104A being deployed to a site in which it will operate. Alternatively, the configuration of the ND 104A can be performed when the ND 104A is already deployed. In all embodiments, the network device 104A is operative to trust the device that is configuring it and to trust the authentication information 103 received. While the embodiments above are described with reference to the ND 104A, similar operations can be performed for configuring any of the NDs 104B-N.

The flow of operations moves to operation 502, at which the trusted ND 102 determines a state indicator. The state indicator is a representation of a state of the DLT network at a given time. Being a full node of the DLT network, the ND 102 has access to or stores the global state of the DLT network 100 at any given time. The DLT network 100 determines a representation of the current state of the DLT network 100. In non-limiting exemplary embodiments, when the DLT network is a blockchain network, the state indicator is determined based on the blockchain that is stored in or accessible to the trusted ND 102. In one example, the state indicator can be a hash of a block from the blockchain stored in the trusted ND 102. In another example a hash of block header can be used as a state indicator.

In some embodiments, where the DLT network 100 is a blockchain network, the representation of the state of the DLT network can be determined based on its suitability for the NDs 104A-B to be used as a ground truth. The suitability of a state of the DLT network 100 can be determined based on security requirements of the network of 104A-N devices in conjunction with the security capabilities of the DLT system. For example, in some blockchain networks, the trusted ND 102 needs to consider block depth and confirmation time and balance the risk of conflicting forks in the blockchain (whose probability decreases with block depth) and the time required to wait (which increases with block depth) before considering the likelihood of blockchain fork unlikely at the given block depth. Other requirements or criteria can be considered to establish a representation of the DLT network 100 by the trusted ND 102 as a state indicator to be transmitted to the NDs 104A-N without departing from the scope of the present embodiments.

The flow of operations moves to operation 502, at which the trusted ND 102 determines the one or more network devices 104A from a plurality of network devices 104A-N coupled with the trusted network device 102. This operation is optional and can be skipped in some embodiments. In some embodiments, the trusted ND 102 is to communicate with a subset of the NDs 104A-N to transmit the beacon message and the subset of the NDs is selected. For example, when the trusted ND 102 is a manager of multiple IoT networks each including different sets of IoT NDs, the trusted ND 102 may select a particular IoT network including a subset of all the IoT devices to which it is to transmit a state indicator of the DLT network 100. In other embodiments, the trusted ND 102 communicates with all NDs 104A-N to transmit the beacon message.

At operation 508, the trusted ND 102 generates the beacon message 110 including the state indicator. In some embodiments, the beacon message further includes a sequence number. The sequence number is indicative of a number of beacon messages transmitted from the trusted ND 102. The sequence number can be used by the receiving network device, e.g., ND 104A, to prevent any malicious entity, e.g., the intermediary ND 106A, from replaying past beacon messages. In these embodiments, the sequence number is incremented for each beacon message sent. In these embodiments, the trusted ND 102 performs operation 306, at which a parameter that is indicative of a number of beacon messages transmitted by the trusted network device 102 is incremented. The current value of this parameter is then used as a sequence number for the next beacon message the trusted ND is to send to the ND 104A. In other embodiments, the sequence number can be omitted from the beacon message if the state indicator contains a parameter that can be used by the receiving network device, e.g., ND 104A, to prevent any malicious entity, e.g., the intermediary ND 106A, from replaying past beacon messages. For example, in some blockchain DLT networks, the block header can be verified by the block hash $B_n$, which contains a monotonic sequence number. In this example, there is no need to add a separate sequence number when the state indicator is the block hash.

The beacon message 110 is generated such that it cannot be tampered with and its sender can be securely identified.

In some embodiments, the beacons message is generated, operation 308, by including the state indicator in a transaction of the DLT network 100 where the transaction is signed based on the authentication information 103.

In some embodiments, the transaction is automatically signed by the trusted ND 102 with the authentication information 103 based on some standard DLT network protocols. In these embodiments, the beacon message 110 that is transmitted from the ND 102 is a transaction message of the DLT network. In other embodiments, while the state indicator can be included in a transaction of the DLT network, the beacon message including the transaction can be another type of message that allows the trusted ND 102 to transmit the state indicator in a secure manner. For example, any of the following transmission protocols: a short message service (SMS), Message Queuing Telemetry Transport (MQTT), HyperText Transfer Protocol (HTTP), or Hyper Text Transfer Protocol Secure (HTTPS) can be used to transmit the state indicator and the beacon message is a message generated based on the selected protocol. Some of these protocols may provide intrinsic integrity protection, e.g., HTTPs or DLT transaction message, such that the beacon message is automatically signed with the authentication information 103. Alternatively, other ones of these protocols may not provide integrity protection for the state indicator. In these alternative embodiments, the trusted ND 102 is operative to sign the transaction including the state indicator based on the authentication information 103 prior to transmitting the transaction as part of the beacon message. For example, when the authentication information 103 is a public key, the trusted ND 102 signs the transaction including the state indicator with the corresponding private key.

By transmitting a beacon message that includes a signed transaction the trusted ND 102 allows the receiving ND 104A to securely identify the sender of the beacon message and the beacon message is tamper-proof.

In some embodiments, the beacon message may include one or more additional fields. For example, the beacon message can include one or a combination of two or more of a transaction value, transaction processing fees, or a source and/or a destination address. These, and potentially other fields, can be set in accordance to normal processing requirements of the DLT network 100. In particular, a destination address may be used to target a specific network device, a group of network devices, or all devices that are configured with that particular trusted ND 102 as the beacon message sender.

For example, in some exemplary blockchain DLT network, the beacon transaction's value can be zero (no transactional value), processing fees set to a value that is high enough to guarantee rapid inclusion in a future block, and the whole transaction would be signed with the trusted ND 102's private key, providing integrity protection for the transaction data. The state indicator is included as the data portion of the transaction. The destination address can match an account, or it can be a dummy address, or address of a smart contract. The destination address may affect the filtering rules applied by the network device ND 104A, but the variability in addressing does not affect the security semantics of the state indicator.

At operation 512, the trusted ND 102 transmits the network device 104A a beacon message including the state indicator. The beacon message is signed based on the authentication information 103 associated with the trusted network device 102. The state indicator is to be used by the network device 104A as a trusted current state of the DLT network 100. In some embodiments, the beacon message 110 is sent to one or more mining NDs, e.g., NDs 105A-M. In some embodiments, the intermediary ND 106A can be a mining ND in the DLT network 100, while in other embodiments, the intermediary ND 106A is not a mining ND. At least one mining ND includes the beacon message in the digital ledger of the DLT network. For example, when the DLT network 100 is a blockchain network, the mining ND includes the beacon message in a block and this block is committed to the blockchain through a consensus mechanism of the blockchain network.

The beacon message 110 is received by the intermediary ND 106A that is coupled with the network device 104A that is intended to receive the beacon message 110. In some embodiments, the beacon message 110 is received by the intermediary ND 106A as part of the consensus mechanism of the DLT network.

The intermediary ND 106A can be a genuine ND or a malicious ND. When the intermediary ND 106 is a malicious ND it can decide to alter the beacon message or to not transmit the beacon message to the ND 104A. When the beacon message is altered by the ND 106A and transmitted to the ND 104A, the ND 104A is operative to detect the tampering.

Figure 6:
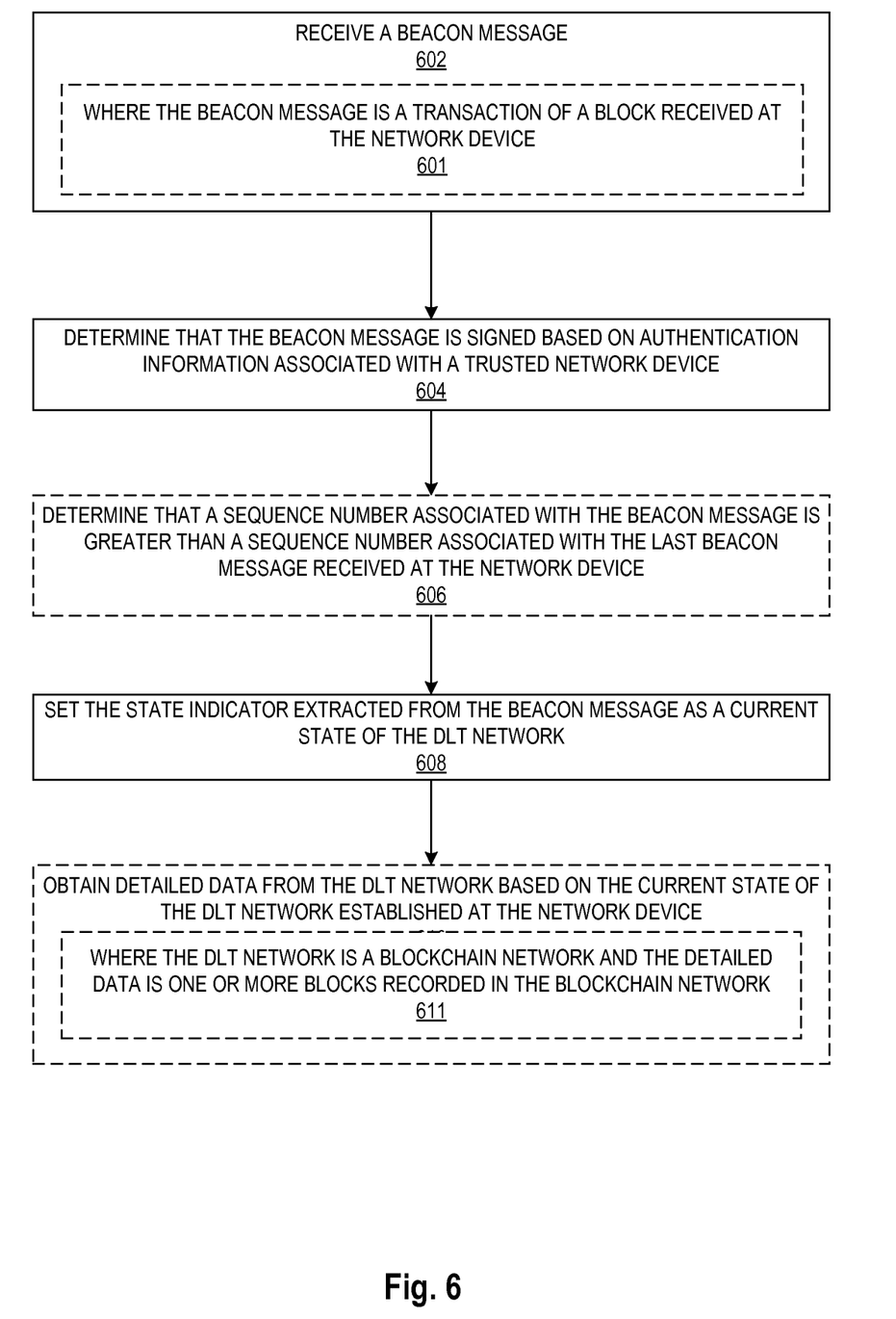
FIG. 6 illustrates a flow diagram of exemplary operations for determining a trusted representation of a DLT network based on a beacon message, in accordance with some embodiments.

FIG. 6 illustrates a flow diagram of exemplary operations for determining a trusted representation of a DLT network based on a beacon message, in accordance with some embodiments. The operations of FIG. 6 are performed by the network device 104A. In additional embodiments, the operations of FIG. 6 can be performed by any one of the NDs 104B-N. At operation 602, the ND 104A receives a beacon message. At operation 604, the ND 104A determines that the beacon message is signed based on authentication information associated with a trusted network device 102. Responsive to determining that the beacon message is signed based on the authentication information, the ND 104A sets, at operation 608, a state indicator extracted from the beacon message as a current state of the DLT network for the network device 104A. In some embodiments, prior to setting the state indicator as a current state of the DLT network 100, the ND 104A determines, operation 606, whether a sequence number associated with the beacon message is greater than a sequence number associated with the last beacon message received at the network device 104A. In these embodiments, setting the state indicator as the current state of the DLT network 100 is performed in response to determining that the sequence number associated with the beacon message is greater than the sequence number associated with the last beacon message received at the network device.

In some embodiments, the ND 104A is further operative to obtain detailed data from the DLT network 100 based on the current state of the DLT network 100 established for the ND 104A. In some embodiments, when the DLT network is a blockchain network, the detailed data is one or more blocks recorded in the blockchain network.

The embodiments presented herein describe systems and methods for establishing a shared view of a state of a digital ledger between a trusted entity (e.g., trusted ND 102), and a network device (e.g., ND 104A). In some embodiments, the network device is a reduced capability device such as an IoT device, with limited resources and limited network connectivity. Without the proposed solution, the reduced capability ND cannot gain the common security guarantees of a DLT state that are available to a full node, or a light client with good network connectivity.

The mechanisms described herein allow reduced capability NDs to establish a ground truth, which can be implemented in-band within the DLT network. The mechanisms allow the reduced capability device owners to deploy the solution without an explicit support of a trust anchor entity in the DLT. In addition, the beacon message verification is lightweight and already part of the protocol for DLT in-band transactions.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the inventive concept may be implemented using different combinations of software, firmware, and/or hardware.

A network device (ND) is an electronic device that communicatively interconnects other electronic devices on the network (e.g., other network devices, end-user devices).

Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the DLT network 100 can be implemented on one or more network devices coupled in a network. For example, each of the trusted ND 102, the intermediary network devices 106A-B, and the mining devices 105A-M can be implemented on one ND or distributed over multiple NDs.

Figure 7:
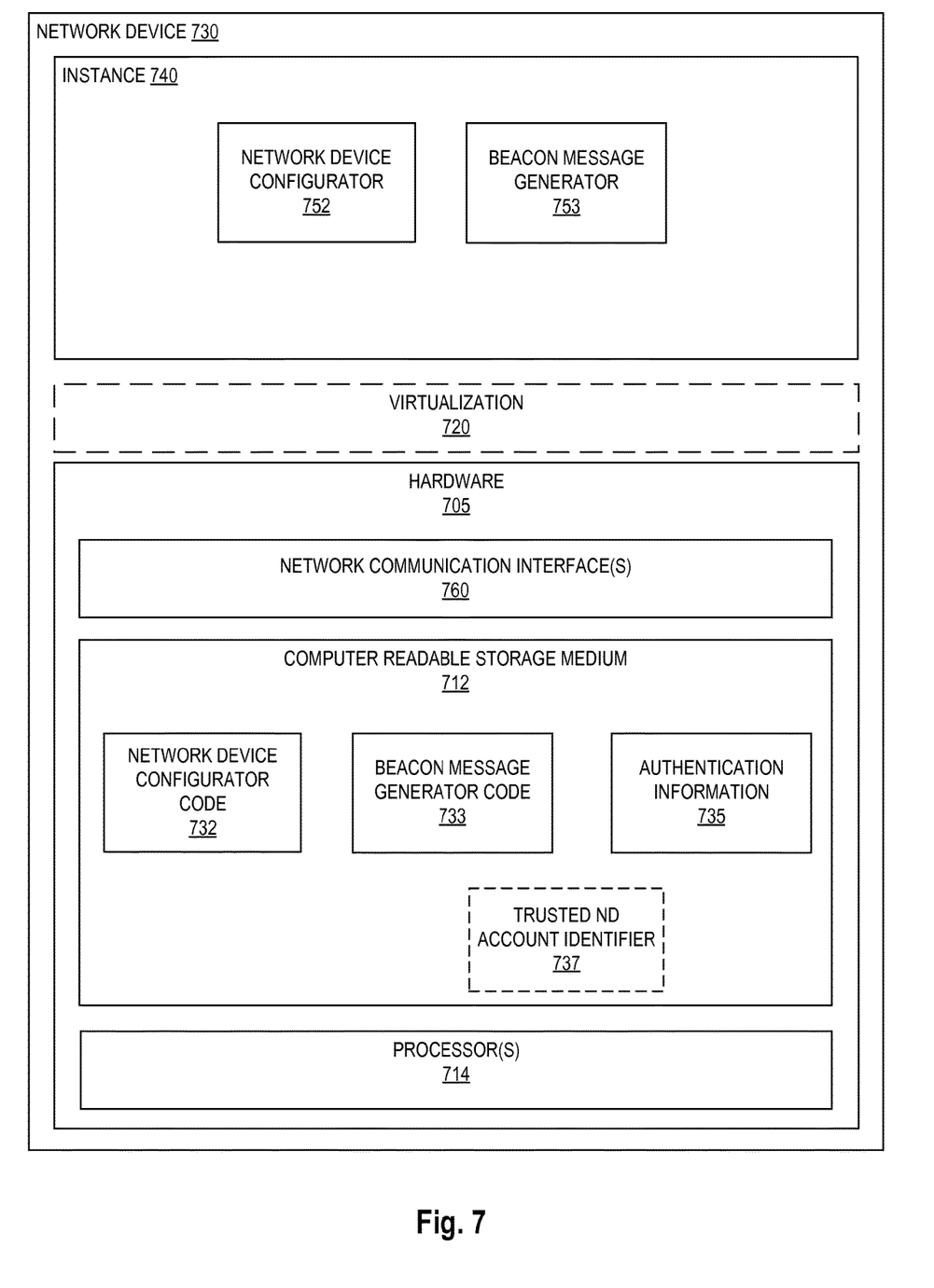
FIG. 7 illustrates a block diagram for a network device that can be used for implementing the trusted network device described herein, in accordance with some embodiments

FIG. 7 illustrates a block diagram for a network device that can be used for implementing the trusted network device described herein, in accordance with some embodiments. The network device 730 may be a web or cloud server, or a cluster of servers, running on server hardware. According to one embodiment, the network device is a server device which includes hardware 705. Hardware 705 includes one or more processors 714, network communication interfaces 760 coupled with a computer readable storage medium 712. The computer readable storage medium 712 may include network device configurator code 732, beacon message generator code 733, authentication information 735, and optional trusted ND account identifier 737. In some embodiments, the various codes stored in the computer readable storage medium 712 can be stored in separate readable storage media elements such that the different component are physically separate from one another.

While one embodiment does not implement virtualization, alternative embodiments may use different forms of virtualization—represented by a virtualization layer 720. In these embodiments, the instance 740 and the hardware that executes it form a virtual server which is a software instance of the modules stored on the computer readable storage medium 712.

Each of the network device configurator code 732 and the beacon message generator code 733 includes instructions which when executed by the hardware 705 causes the instance 740 to respectively implement a network configurator 752 and a beacon message generator 753 that are operative to perform the operations performed by a trusted ND 102 described with reference to FIGS. 1-6.

Figure 8:
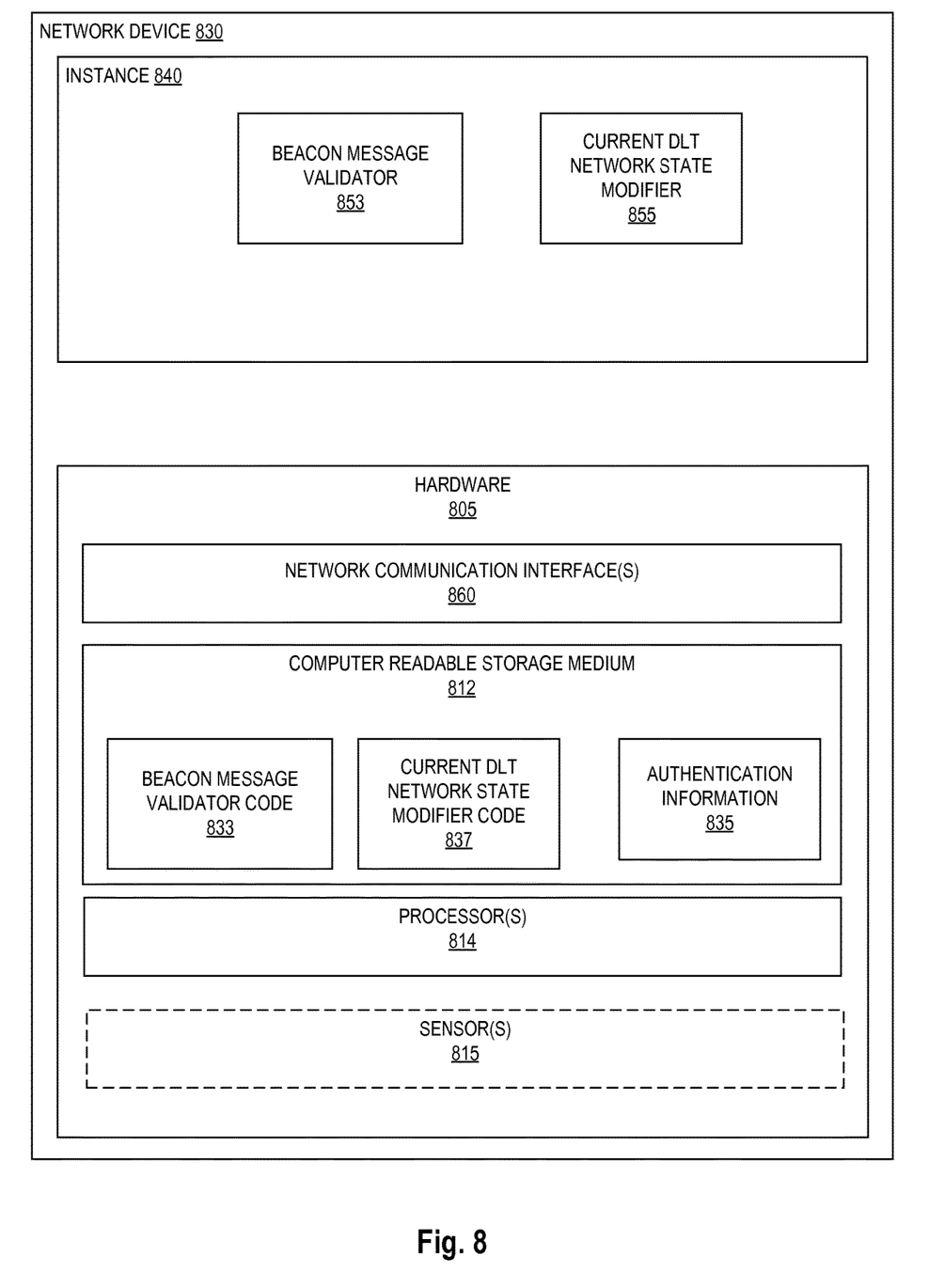
FIG. 8 illustrates a block diagram for a network device that can be used for implementing one or more of the network devices described herein, in accordance with some embodiments.

FIG. 8 illustrates a block diagram for a network device that can be used for implementing one or more of the network devices described herein, in accordance with some embodiments. Each one of the NDs 104A-N is a network device as illustrated in FIG. 8. The network device 830 may be a network device of reduced capability that has limited processing, storage, and/or networking capabilities. For example, ND 830 can be IoT device. The ND 830 may include hardware 805. Hardware 805 includes one or more processors 814, network communication interfaces 860 coupled with a computer readable storage medium 812, and optional one or more sensor(s) 815. The computer readable storage medium 812 may include beacon message validator code 833, current DLT network modifier code 837, and the authentication information 835.

Each of the beacon message validator code 833, current DLT network modifier code 837 includes instructions which when executed by the hardware 805 causes the instance 840 to respectively implement a beacon message validator 853 and a current DLT network state modifier 755 that are operative to perform the operations performed by any one of the NDs 104A-N described with reference to FIGS. 1-6.

While the flow diagrams in the figures show a particular order of operations performed by certain embodiments of the inventive concept, it should be understood that such order is exemplary (e.g., alternative embodiments may perform the operations in a different order, combine certain operations, overlap certain operations, etc.).

While the inventive concept has been described in terms of several embodiments, those skilled in the art will recognize that the inventive concept is not limited to the embodiments described, can be practiced with modification and alteration within the spirit and scope of the appended claims. The description is thus to be regarded as illustrative instead of limiting.

The invention claimed is:

1. A method performed by a trusted network device for transmitting a trusted representation of a state of a distributed ledger technology (DLT) network to one or more network devices, the method comprising:
   determining a state indicator, wherein the state indicator is a representation of a state of the DLT network at a given time; and
   transmitting to one or more network devices a beacon message including the state indicator, wherein the beacon message is signed based on authentication information associated with the trusted network device;
   wherein generating the beacon message comprises including the state indicator in a transaction of the DLT network, wherein the transaction is signed based on the authentication information.

2. The method of claim 1, wherein the beacon message includes one or more additional fields including at least one of a transaction value, transaction processing fees, a destination address.

3. The method of claim 1, wherein the authentication information is a public key of a private/public keys pair uniquely associated with the trusted network device.

4. A trusted network device for transmitting a trusted representation of a state of a distributed ledge technology (DLT) network to one or more network devices, the trusted network device comprising:
   one or more processors; and
   a computer memory storing a set of computer readable instructions that when executed by the one or more processors cause the trusted network device to:
   determine a state indicator, wherein the state indicator is a representation of a state of the DLT network at a given time; and
   transmit to one or more network devices a beacon message including the state indicator, wherein the beacon message is signed based on authentication information associated with the trusted network device;
   wherein the one or more processors cause the trusted network device to generate the beacon message by including the state indicator in a transaction of the DLT network, wherein the transaction is signed based on the authentication information.

5. The trusted network device of claim 4, wherein the beacon message includes one or more additional fields including at least one of a transaction value, transaction processing fees, a destination address.

6. The trusted network device of claim 4, wherein the beacon message further includes a sequence number, and wherein the one or more processors further cause the trusted network device to:
   increment a parameter that is indicative of a number of beacon messages transmitted by the trusted network device.

7. The trusted network device of claim 4, wherein the one or more processors further cause the trusted network device to:
determine the one or more network devices from a plurality of network devices coupled with the trusted network device.

8. The trusted network device of claim 4, wherein the one or more network devices comprise Internet of things (IoT) network devices.

9. The trusted network device of claim 4, wherein the one or more processors further cause the trusted network device to:
configure each of the one or more network devices with the authentication information during an initial phase prior to the determining and the transmitting.

10. The trusted network device of claim 4, wherein the authentication information is a public key of a private/public keys pair uniquely associated with the trusted network device.

11. A method performed by a network device, the method comprising:
receiving a beacon message;
determining that the beacon message is signed based on authentication information associated with a trusted network device; and
responsive to determining that the beacon message is signed based on the authentication information, setting a state indicator extracted from the beacon message as a current state of a distributed ledger technology (DLT) network for the network device, wherein the state indicator is a hash of a block header.

12. The method of claim 11, wherein setting the state indicator as the current state of the DLT network is performed in response to determining that a sequence number associated with the beacon message is greater than a sequence number associated with the last beacon message received at the network device.

13. A network device comprising:
one or more processors; and
a computer readable storage medium storing a set of computer readable instructions that when executed by the one or more processors cause the network device to:
receive a beacon message,
determine that the beacon message is signed based on authentication information associated with a trusted network device, and
responsive to determining that the beacon message is signed based on the authentication information, set a state indicator extracted from the beacon message as a current state of a distributed ledger technology (DLT) network for the network device, wherein the state indicator is a hash of a block header.

14. The network device of claim 13, wherein the one or more processors cause the trusted network device to set the state indicator as the current state of the DLT network in response to determining that a sequence number associated with the beacon message is greater than a sequence number associated with the last beacon message received at the network device.

15. The network device of claim 13, wherein the one or more processors further cause the network device to:
obtain data from the DLT network based on the current state of the DLT network established at the network device.

16. The network device of claim 15, wherein the DLT network is a blockchain network and the data is one or more blocks recorded in the blockchain network.

17. The network device of claim 16, wherein the one or more processors cause the trusted network device to receive the beacon message by receiving a block including one or more transactions and the beacon message is a transaction from the one or more transactions signed by the trusted network device.

* * * * *